May 30, 1933.  I. KUKLENSKI  1,911,624
MACHINE FOR ASSEMBLING SPRINGS
Filed Feb. 24, 1932  3 Sheets-Sheet 1
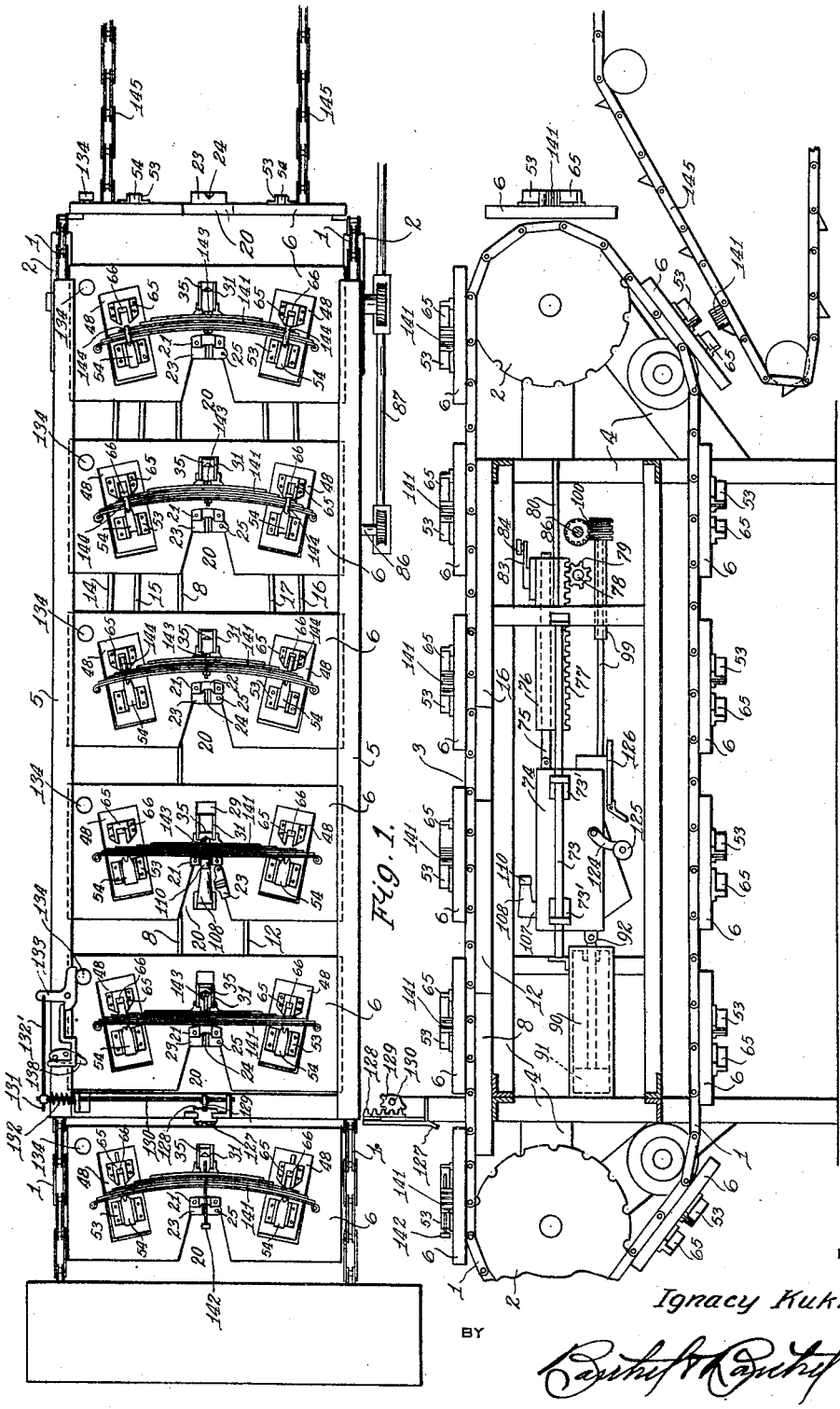
INVENTOR
*Ignacy Kuklenski*
BY
ATTORNEYS May 30, 1933. I. KUKLENSKI 1,911,624
MACHINE FOR ASSEMBLING SPRINGS
Filed Feb. 24, 1932 3 Sheets-Sheet 2
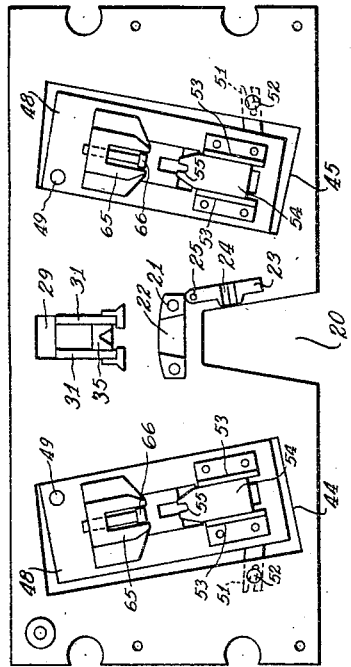
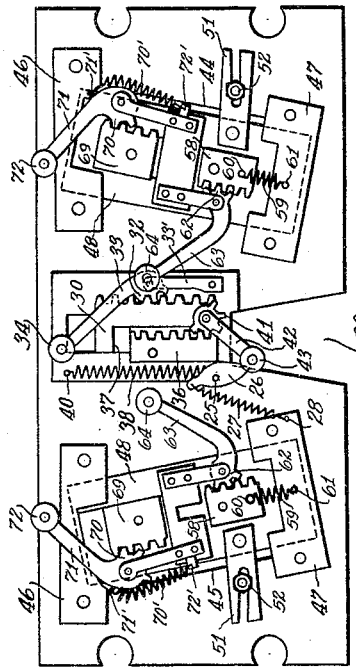
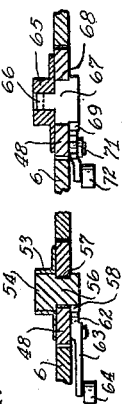
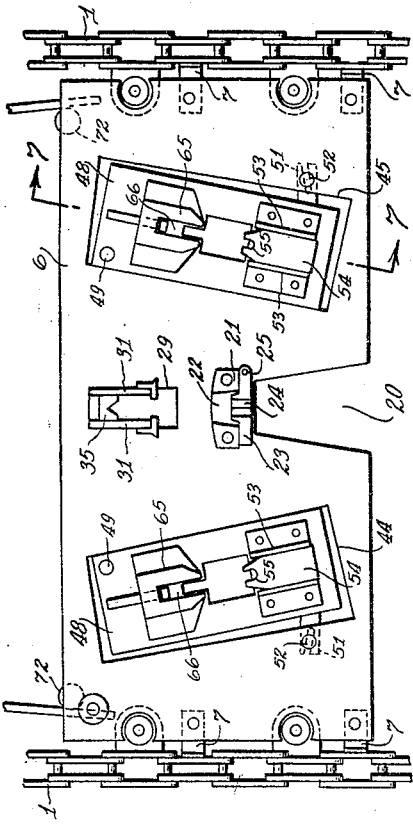
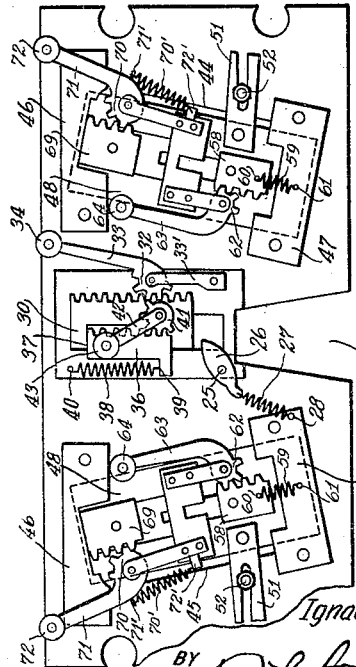
INVENTOR
Ignacy Kuklenski
BY
ATTORNEYS May 30, 1933. I. KUKLENSKI 1,911,624
MACHINE FOR ASSEMBLING SPRINGS
Filed Feb. 24, 1932 3 Sheets-Sheet 3
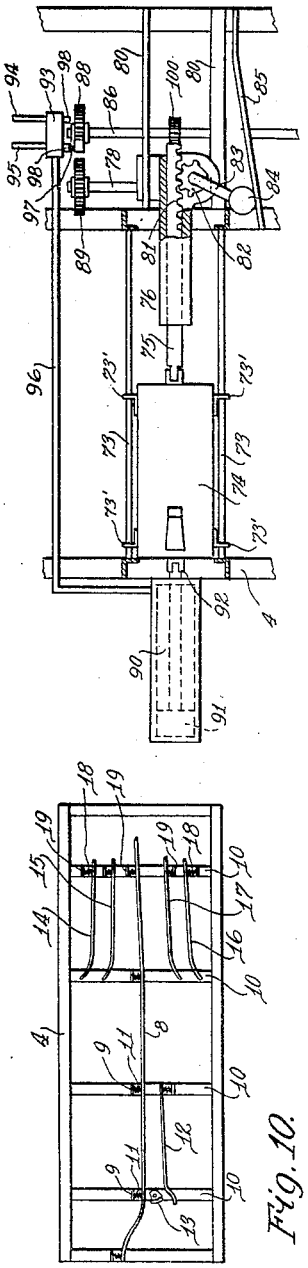
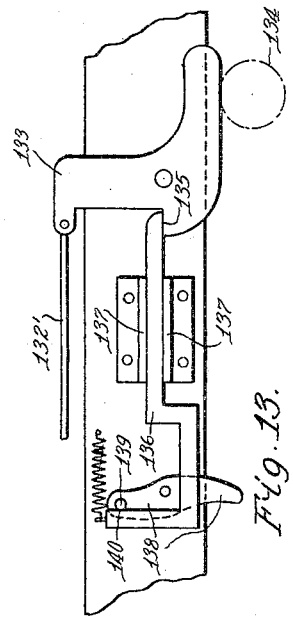
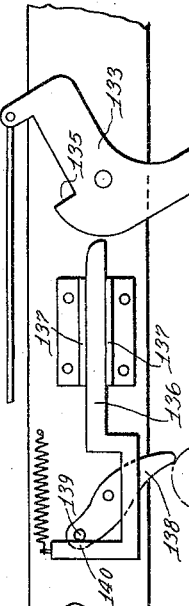
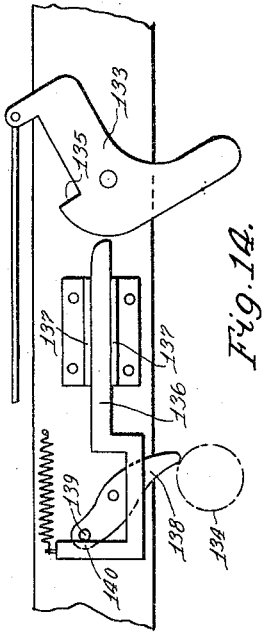
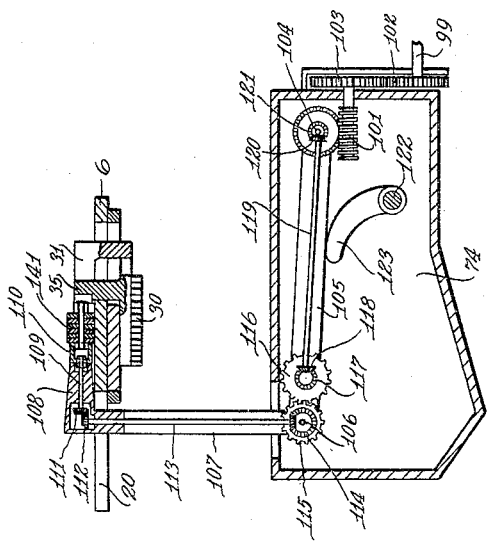
INVENTOR
*Ignacy Kuklenski*
BY
ATTORNEYS Patented May 30, 1933

1,911,624

UNITED STATES PATENT OFFICE

IGNACY KUKLENSKI, OF DETROIT, MICHIGAN

MACHINE FOR ASSEMBLING SPRINGS

Application filed February 24, 1932. Serial No. 594,855.

The present invention pertains to a novel machine for holding and securing the several leaves of a spring together.

The primary object of the present invention is to provide a machine which includes a series of flat tables that are secured to chains which are guided and driven in a horizontal run above a series of cam tracks so that said plates are carried along the top of said cam tracks. On each plate there is provided means for receiving the several leaves of a spring that are arranged in their proper relation. This means includes movable members that are actuated by contact with said cam tracks so that as each table is propelled over said tracks by said chains the leaves of the springs are tightly clamped together intermediate the ends thereof and a bolt is automatically forced through a central opening in the leaves, a nut is automatically screwed onto said bolt, the leaves are automatically clamped together adjacent their ends, and clips are forced thereon ready for their securing bolts or rivets.

With the above and other ends in view the invention is fully set forth in the following specification and more particularly pointed out in the appended claims, reference being had to the accompanying drawings, in which Figure 1 is a top plan view of the present machine;

Fig. 2 is a side elevation with certain parts removed and in cross section;

Fig. 3 is a top plan view of one of the tables with the members thereon in their inactive position;

Fig. 4 is a bottom plan thereof;

Fig. 5 is a top plan view of one of the tables illustrating the active position of the members thereon;

Fig. 6 is a bottom plan view thereof;

Fig. 7 is a cross sectional view of one of the tables taken along the line 7—7 of Fig. 3;

Fig. 8 is a cross sectional view taken along the line 8—8 of Fig. 7;

Fig. 9 is a cross sectional view taken along the line 9—9 of Fig. 7;

Fig. 10 is a plan view illustrating the arrangement of the cam tracks;

Fig. 11 is a plan view of the automatic wrench for screwing the nut onto the bolt that holds the leaves of the spring together;

Fig. 12 is a cross sectional view thereof;

Fig. 13 is a plan view of a safety device that operates in combination with the moving tables, and Fig. 14 is a plan view thereof illustrating another stage in its operation.

Like characters of reference are employed throughout to designate corresponding parts.

A pair of spaced endless chains 1 are mounted on sprockets 2 that are arranged so that said chains are supported in parallel spaced relation and in a horizontal run 3. The sprockets 2 are supported in the ends of a suitable frame 4 so that the horizontal runs 3 of the chain pass from one end to the other of said frame. Guide members 5 are secured on top of the frame 4 through which the runs 3 of the chains pass.

Tables 6 have their opposite ends secured to opposite chains 1 at regular intervals by brackets 7 and are adapted to be propelled by said chains when the sprockets 2 are driven in any suitable manner. Supported in a plane beneath the parallel runs 3 of the chains are a series of cam tracks which include the central cam track 8 which is supported in a resilient manner by brackets 9 that are secured to cross frame members 10, slip pins being secured between the bracket 9 and the cam track and having coiled springs 11 surrounding the same. This mounting indicates that the cam tracks are mounted in a manner whereby they may move slightly upon the exertion of external pressure thereon by means later to be described. A cam track 12 is secured upon the top of the cross frame members 10 and has a frog 13 supported adjacent the forward end thereof. Nearer the rear end of the frame 4 are supported a plurality of cam tracks 14 and 15 on one side of the cam track 8 and 16 and 17 on the opposite side of the cam track 8. Coiled springs 18 are interposed between the cam tracks and their supporting brackets 19 to permit movement of said tracks by any pressure sufficient to overcome the pressure of the coiled springs.

The chains 1 propel the tables 6 along the tops of said cam tracks and means for clamping the several leaves of a spring together are mounted on said tables and actuated by contact with said cam tracks. Each table is provided with clamping means and therefore the clamping and securing of several springs may be progressively accomplished at one time.

Each table is provided with a notch 20 entering from the rear edge thereof intermediate the ends thereof and adjacent said notch is rigidly mounted a block 21 having a central notch 22 in the center thereof. Adjacent the block 21 is mounted a pivoted indexing member 23 having a V-shaped groove 24. The indexing member 23 is rigidly mounted on a pin 25 that extends through the table 6 and has a cam 26 rigidly mounted thereon. A spring 27 is connected between the cam 26 and a rigid pin 28 to normally hold the cam in the position illustrated in Fig. 4 which holds the indexing member 23 in the position illustrated in Fig. 3.

In line with the notch 20 and the block 21 is formed an opening 29 in the table 6 and slidably secured on the bottom of the table is a rack plate 30 having a pair of spaced members 31 secured thereto to project through the opening 29 to a point above the top surface of said table. A segment 32 is pivotally supported by a bracket 33' that is rigidly secured in relation to the table and is provided with an outwardly extending arm 33 that carries a roller 34 at its outer end. It is apparent that rotation of said segment moves said rack plate and members 31 longitudinally so that the spaced members 31 move closer to the block 21. Slidably mounted between the spaced members 31 is a block 35 that is connected to a rack bar 36 that is received in a recess 36' in the rack plate 30 and which butts against a shoulder 37 formed by said recess. A coiled spring 38 is connected to the rack bar 36 as at 39 and to a rigid pin 40 in a manner to normally move the rack bar 36 into engagement with the shoulder 37 and cause the rack plate 30 to move to the position illustrated in Fig. 4. A segment 41 is pivotally secured on the bottom of the rack plate 30 to mesh with the rack bar 36 and has an outwardly projecting arm 42 supporting a roller 43 at its outer end. The rack bar is so arranged as to be moved longitudinally in relation to the rack plate 30 when the segment 41 is rotated by means of the arm 42 and it is further supported in a plane whereby it contacts with the cam 26.

As the table is propelled along over the above described cam tracks the roller 34 on the arm 33 engages the cam track 8 and the roller 43 on the arm 42 engages the cam track 12.

A pair of openings 44 and 45 are formed in each table 6, the openings being equally spaced outwardly on each side of the block 21. Strap members 46 are secured to the bottom face of the table 6 to project across a portion adjacent the front of the openings 44 and 45 and strap members 47 project across the rear thereof. A plate 48 is received in said openings and rests upon said strap members, each plate being pivotally attached as at 49 to the strap 46. A fork member 51 is secured to the plates 48 and is engaged by a bolt and nut 52 to hold the plates against movement.

The mechanism mounted on each plate 48 is identical in construction and it will be necessary, therefore, that only one should be described in detail.

Mounted on top of the plate 48 are a pair of guides 53 between which is slidably received a head 54 having a notch 55 formed in the forward end thereof. The sliding head 54 has a portion 56 that projects through a slot 57 in the plate 48 to connect it to a rack bar 58. A coiled spring 59 is connected as at 60 to the rack bar 58 and to a rigid pin 61 to normally hold the rack bar 58 in the position shown in Fig. 4 and the sliding head 54 in the position shown in Fig. 3. A segment 62 meshes with the rack 58 and is provided with an outwardly projecting arm 63 that carries a roller 64 at its outer end.

The roller 64 on the arm 63 that is carried by the plate 48 in the recess 44 engages the cam track 15 and the roller carried by the arm on the plate in the recess 45 engages the cam track 17.

On the plate 48, is rigidly secured a guide member 65 and a sliding head 66 is slidably received therein. The head 66 has a portion 67 that projects through a slot 68 in the plate 48 to connect it to a rack 69. A segment 70 meshes with the rack 69 and has an outwardly projecting arm 71 that supports a roller 72 at its outer end. A coiled spring 70' is connected as at 71' to the arm 71 and at its opposite end to a rigid member 72' and exerts pressure normally tending to hold the sliding head 66 in the position illustrated in Fig. 3. The roller 72 adjacent the opening 44 is adapted to engage the cam track 14 and the similar roller adjacent the opening 45 is adapted to engage the cam track 16.

A pair of spaced parallel rods 73 are rigidly secured in the supporting frame 4 and slidably received on the rods are brackets 73' that carry a gear box 74. A rod 75 is connected to the box 74 and is slidably received in a tubular member 76 having a rack 77 secured or formed on the bottom thereof. A shaft 78 supports a gear 79 that meshes with said rack 77 in a manner whereby rotation of the gear propels said tubular member 76 longitudinally in its supporting guides 80. The manner in which the shaft 78 is rotated will be presently described.

The rod 75 is provided with a gear teeth portion 81 and meshing therewith is a segment 82 carrying an outwardly projecting arm 83 that supports a roller 84 at its outer end. A cam 85 is mounted in the supporting frame 4 and is engaged by said roller 84 in a manner to pivot the arm 83 when the tubular member 76 is moved longitudinally so that longitudinal movement of the tubular member is accompanied by sliding movement of the rod 75 resulting from the rotation of the segment 82 caused by pivotal movement of the arm 83.

A shaft 86 is supported by the frame 4 and is driven from the main drive or power shaft 87. The shaft 86 carries a mutilated gear 88 which meshes at regular intervals with a gear 89 carried by the shaft 78 and therefore the gear 79 is rotated at regular intervals to move the tubular member 76 in the manner above described and thereby move the box 74 forward. To move the box 74 backwardly when the mutilated gear 88 is not driving the gear 89 there is provided fluid pressure means which comprises a cylinder 90 having a piston 91 slidably mounted therein and connected as at 92 to the box 74. A valve body 93 is provided with a pressure intake 94 and an exhaust 95 and is connected by a line 96 to the cylinder 90. A projecting finger 97 on the mutilated gear 88 engages the valve actuating members 98 to supply pressure to said cylinder when the gears 88 and 89 have no driving connection and to exhaust the fluid from the cylinder 90 when the gears are meshing.

A telescoping drive shaft 99 is driven by the worm and gear 100 from the shaft 86 and in turn drives a worm 101 within the box 74 through gears 102 and 103. The worm 101 drives a shaft 104 which loosely carries a pair of arms 105 that carry a shaft 106 at their outer ends. Pivotally mounted on the shaft 106 are a pair of upwardly extending arms 107 which carry a head 108. Rotatably mounted in the head 108 is a shaft 109 that carries a socket 110 at its outer end and a bevelled gear 111 at its inner end that meshes with a bevelled gear 112 on the upper end of a shaft 113. The shaft 113 is rotated through a bevelled gear 114 that is driven by a gear 115 through a gear 116, bevelled gears 117 and 118, shaft 119, and bevelled gears 120 and 121, the latter of which is secured to the shaft 104.

The socket 110 is shaped to receive a nut and to screw it on a bolt which passes through springs that are held on the tables 6 in a manner to be presently described but it is necessary that the socket should be alternately raised and lowered. To accomplish this there is provided a shaft 122 that carries arms 123 that engage the arms 105 in a manner whereby rotation of the shaft 122 causes the arms 123 to raise the arms 105, arms 107 and socket 110 to the position illustrated in Fig. 12. To rotate the shaft 122 there is secured an arm 124 on the outer end thereof which has a roller 125 that engages a cam 126 when the box is moved forward by the above described means. Continued forward movement permits the roller 125 to run off the end of the cam 126 and when the box is moved backward by the fluid pressure means the roller passes under the cam.

It is the ordinary practice to assemble the several leaves of the spring manually because of the necessity of arranging them in a particular relation owing to the different lengths of the leaves. The spring leaves usually have an opening intermediate their ends through which a bolt is passed to secure them together and the assembly consists in taking the several leaves and loosely assembling them on a pin. Before bolting the leaves together it is necessary to remove such pin and provision is made by the present device for automatically accomplishing the same.

A forked member 127 is supported to slide vertically above the tables 6 and carries a rack 128 with which a segment 129 meshes, in a manner whereby rotation of the segment causes the forked member to be raised or lowered. The segment 129 is mounted on a shaft 130 that carries a crank 131 at its outer end and a spring 132 that normally rotates the shaft 130 to lower the forked member from the raised position illustrated in Fig. 2. The actuating means which holds the shaft 130 against rotation with the fork raised through means of the crank 131 and a connecting rod 132' is illustrated in Figs. 13 and 14. The means comprises a bell crank lever 133 which projects into the path of a roller 134, there being one of the latter mounted on each of the tables 6. The bell crank 133 is provided with a shoulder 135 which is engaged by a bar 136 that is slidably held between guides 137. When the sliding bar 136 engages the shoulder 135 as illustrated in Fig. 13 the fork 127 is in the raised position and inasmuch as the lever 133 is held against rotation it is impossible to lower the fork. A second lever 138 is pivotally mounted to project into the path of the rollers 134 and has a pin 139 projecting upwardly therefrom to engage the bar 136 as at 140 so that contact of a roller 134 with the lever 138 causes the latter to pivot and slide the bar 136 so that it no longer contacts with the shoulder 135 and the lever 133 pivots as a result of the pressure of the spring 132 and permits the fork to lower.

In operation the several leaves of the spring 141 which have been previously assembled on a pin 142 are placed on top of the table 6. The pin 142 rests in the V-shaped groove 24 in the indexing member 23 and thus definitely locates the leaves thereon. As the chains propel the table along, the roller 34 on the arm 33 comes into engagement with the cam track 8 and causes the spaced sliding members 31 to move from the position illustrated in Fig. 3 to that illustrated in Fig. 5. In the latter position the members 31 engage the top leaf of the spring 141 and cause the several leaves to be tightly clamped between the members 31 and the block 21. The pin 142 extends through the slot 22.

Accompanying the above described clamping movement is the removal of the pin 142 from the leaves. The latter is accomplished by contact of one of the rollers 134 with the lever 138, causing the same to pivot to the position shown in Fig. 14 wherein the safety bar 136 is withdrawn so that pivotal movement of the lever 133 and crank 131 is permitted as a result of the pressure of the spring 132 which rotates the segment 129 and lowers the fork 127. This movement is timed by correct placing of the lever 138 so that the fork engages the head of the pin 147 as it moves along with the spring leaves on the table 6. The pin 142 is held stationary by the fork while the spring continues its movement with the table. After the pin is thus withdrawn from the leaves of the spring the roller 134 will have reached the lever 133 and cause the lever to be moved to the position illustrated in Fig. 14 where the fork is raised out of the path of the next oncoming table.

At this stage of movement a bolt 143 is placed between the two spaced members 31 with its point partially inserted in the openings in the spring leaves 141 from which the pin 142 was previously extracted. As the table 13 continues its movement the roller 43 comes into contact with the frog 13 which swings it around until it engages the cam track 12 which moves it to substantially the position illustrated in Fig. 6 and at the same time the segment 41 is rotated to move the rack bar 36 longitudinally which moves the sliding head 35 towards the block 21. The movement of the sliding head 35 forces the bolt 143 into the holes from which the pin 142 was withdrawn. At the same time the rack bar 36 engages the cam 26 and causes the same to move pivotally until it reaches the position illustrated in Fig. 6 and the indexing member 23 is also moved to the position illustrated in Fig. 5.

When the above described stage in the operation is reached the mutilated gear 88 begins to mesh with the gear 89 and the shaft 78 is rotated. As the shaft 78 rotates the gear 79 moves the tubular member 76 and the box 74 forward. With the forward movement of the box the roller 125 and arm 124 co-act with the cam 126 to rotate the shaft 122 and raise the socket wrench upwardly and a nut is inserted in the socket 110 which continuously rotates as a result of the above described driving connections. By the time the wrench is raised the roller 84 is climbing the higher part of the cam 85 and the rod 75 is moved longitudinally within the tubular member 76. The latter movement results in faster movement of the box 74 than of the tubular member and causes the socket wrench to move forward and screw the nut onto the bolt 143. After sufficient time has elapsed to screw the nut in place the roller 125 rolls off the end of the cam 126 and the wrench is permitted to drop because of the fact that at that time the mutilated gear stops driving the gear 89 and therefore the tubular member stops moving and the table 6 over which it is projecting moves forward away from it. At this time the valve 93 is actuated by the finger 97 on the mutilated gear and fluid pressure is supplied to the cylinder 90 and the box 74 moved back to its original position ready for actuation upon arrival of the next table at which time the mutilated gear will again mesh with the gear 89.

As the table continues in its movement the rollers 64 and 72 engage their respective cam tracks 15 and 14 and 17 and 16. The arms 64 are moved to the position illustrated in Fig. 6 and the rack bar 58 moves longitudinally accompanied with the member 54 and the leaves of the spring are clamped between the member 54 and the stationary guide member 65. At this time clips 144 are placed in the guide members 65 and as the arm 71 is swung by contact of the roller 72 with the cam track 14 the sliding head 66 moves toward the sliding member 54 and forces the clips over the leaves of the spring. A pin or rivet may then be inserted in the usual manner through the holes in the clips.

As the table passes the ends of the cam tracks the clamping members all resume their former positions and the assembled, bolted, and clipped spring rests on the table until it rounds the forward sprocket 2 at which time it falls by force of gravity onto a chain conveyor 145.

Although a specific embodiment of the present invention has been illustrated and described it is to be understood that various changes may be made in the details of construction without departing from the spirit of the invention as set forth in the appended claims, and such changes are contemplated.

What I claim is:—

1. A machine of the character described comprising a plurality of tables mounted upon endless chains, a series of cam tracks over which said chains propel said tables, movable members carried by said tables between which the leaves of a spring having openings intermediate their ends are adapted to be inserted, one of said movable members being adapted to receive a bolt, and means carried by said tables and adapted to engage said cam tracks as said tables are propelled by said chains in a manner to tightly clamp said spring leaves together and force said bolt through said openings in said springs.

2. A machine of the character described comprising a plurality of tables mounted upon endless chains, a series of cam tracks over which said chains propel said tables, movable members carried by said tables between which the leaves of a spring having openings intermediate their ends are adapted to be inserted, one of said movable members being adapted to receive a bolt, indexing means for locating said spring leaves with their openings in the proper relation to said table, and means carried by said tables and adapted to engage said cam tracks as said tables are propelled by said chains in a manner to tightly clamp said spring leaves together and force said bolt through said openings in said springs.

3. A machine of the character described comprising a plurality of tables mounted upon endless chains, a series of cam tracks over which said chains propel said tables, movable members carried by said tables between which the leaves of a spring having openings intermediate their ends are adapted to be inserted, one of said movable members being adapted to receive a bolt, a pair of said members being adapted to receive a clip, and pivoted members carried by said table and adapted to engage said cam tracks as it is propelled thereover for causing movement of said movable members in a manner to tightly clamp said spring leaves together, force said bolt through said central opening, and force said clips over said leaves.

4. A machine of the character described comprising a plurality of tables mounted upon endless chains, a series of cam tracks over which said chains propel said tables, movable members carried by said tables between which the leaves of a spring having openings intermediate their ends are adapted to be inserted, one of said movable members being adapted to receive a bolt, means carried by said tables and adapted to engage said cam tracks as said tables are propelled by said chains in a manner to tightly clamp said spring leaves together and force said bolt through said openings in said springs, a socket wrench adapted to receive a nut, and means for operating said wrench to automatically screw said nut onto said bolt.

5. A machine of the character described comprising a plurality of tables mounted upon endless chains, a series of cam tracks over which said chains propel said tables, movable members carried by said tables between which the leaves of a spring having openings intermediate their ends are adapted to receive a bolt, indexing means for locating said spring leaves with their openings in the proper relation to said table, means carried by said tables and adapted to engage said cam tracks as said tables are propelled by said chains in a manner to tightly clamp said spring leaves together and force said bolt through said openings in said springs, a socket wrench adapted to receive a nut, and means for operating said wrench to automatically screw said nut onto said bolt.

6. A machine of the character described comprising a plurality of tables mounted upon endless chains, a series of cam tracks over which said chains propel said tables, movable members carried by said tables between which the leaves of a spring having openings intermediate their ends are adapted to be inserted, one of said movable members being adapted to receive a bolt, a pair of said members being adapted to receive a clip, and pivoted members carried by said table and adapted to receive a clip, pivoted members carried by said table and adapted to engage said cam tracks as it is propelled thereover for causing movement of said movable members in a manner to tightly clamp said spring leaves together, force said bolt through said central opening, and force said clip over said leaves, a socket wrench adapted to receive a nut, and means for operating said wrench to automatically screw said nut onto said bolt.

7. A spring assembly machine comprising clamping members adapted for cam actuation, slidable elements within said clamping members and movable independently in relation to said clamping members, a plurality of cams, and means for carrying said clamping members into contact with said cams to actuate said clamping members and slidable members therein.

8. A machine for assembling the leaves of springs having an opening intermediate the ends thereof comprising cam actuated clamping members, a cam actuated slidable element within one of said clamping members adapted to receive a bolt, cam members, and means for carrying said clamping members into contact with said cams to independently actuate said clamping members and said sliding member to force a bolt through the opening in said spring leaves.

9. A machine for assembling the leaves of springs having an opening intermediate their ends comprising movable clamping members adapted for cam actuation, slidable elements within certain of said clamping members adapted to receive spring clips, a slidable element within one of said clamping members adapted to receive a bolt, a plurality of independent cams for actuating said clamping members and slidable elements, and means for carrying said clamping members and slidable elements into operative contact with said cams.

10. A machine for assembling the leaves of springs having an opening intermediate their ends comprising clamping members adapted to receive the spring leaves, cam actuated means for operating said clamping members, a slidable element in one of said clamping members adapted to receive a bolt, cam actuated means for operating said slidable element to force the bolt through the openings in said leaves, a plurality of cams, and means for carrying said clamping members, slidable elements and operating means therefor into operative contact with said cams.

11. A machine for assembling the leaves of springs having an opening intermediate their ends comprising clamping members adapted to receive the spring leaves, cam actuated means for operating said clamping members, a slidable element in one of said clamping members adapted to receive a bolt, cam actuated means for operating said slidable element to force the bolt through the openings in said leaves, a plurality of cams, means for carrying said clamping members, slidable elements and operating means therefor into operative contact with said cams, a wrench adapted to receive a nut, and means for operating said wrench to automatically screw said nut on said bolt.

12. A machine for assembling the leaves of springs comprising cam actuated clamping members for receiving loose spring leaves, cam actuated means for receiving clips and operable to force said clips over said leaves, a plurality of cams, and means for carrying said clamping members and clip receiving means into operative contact with said cams.

13. A machine for assembling the leaves of springs comprising cam actuated clamping members for receiving loose spring leaves having an opening intermediate their ends, cam actuated means for receiving a bolt and forcing it through the openings in said leaves, a plurality of cams, and means for carrying said clamping members and bolt receiving members into operative contact with said cams.

14. A machine for assembling the leaves of springs comprising cam actuated clamping members for receiving loose spring leaves having an opening intermediate their ends, cam actuated means for receiving a bolt and forcing it through the openings in said leaves, a plurality of cams, means for carrying said clamping members and bolt receiving members into operative contact with said cams, a wrench adapted to receive a nut, and means for operating said wrench to automatically screw said nut on said bolt.

15. A machine for assembling the leaves of springs comprising cam actuated clamping members adapted to receive loose leaves having openings intermediate their ends, cam actuated means for receiving clips and forcing them over the leaves of the springs, cam actuated means for receiving a bolt and forcing it through the openings in said leaves, a plurality of cams, and means for carrying said clamping members, said clip receiving members and said bolt receiving member into operative contact with said cams.

In testimony whereof I affix my signature.

IGNACY KUKLENSKI.